United States Patent
Ward (10) Patent No.: US 9,501,818 B2
(45) Date of Patent: *Nov. 22, 2016

(54) LOCAL MULTISCALE TONE-MAPPING OPERATOR

(71) Applicant: DOLBY LABORATORIES LICENSING CORPORATION, San Francisco, CA (US)

(72) Inventor: Gregory John Ward, Berkeley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/992,428

(22) Filed: Jan. 11, 2016

(65) Prior Publication Data

US 2016/0125581 A1 May 5, 2016

Related U.S. Application Data

(63) Continuation of application No. 13/984,524, filed as application No. PCT/US2012/027267 on Mar. 1, 2012, now Pat. No. 9,299,317.

(60) Provisional application No. 61/448,606, filed on Mar. 2, 2011.

(51) Int. Cl.
    *G06K 9/00* (2006.01)
    *G06T 5/00* (2006.01)
    (Continued)

(52) U.S. Cl.
    CPC ............... *G06T 5/009* (2013.01); *G06T 5/007* (2013.01); *G06T 5/008* (2013.01); *G06T 5/40* (2013.01);
    (Continued)

(58) Field of Classification Search
    CPC ......... G06T 5/001; G06T 5/40; G06T 5/009; G06T 5/008; H04N 1/60; H04N 1/6027; H04N 9/045
    See application file for complete search history.

(56) References Cited

U.S. PATENT DOCUMENTS

| 6,285,798 B1 | 9/2001 | Lee |
| 7,382,931 B2 | 6/2008 | Kang |

(Continued)

FOREIGN PATENT DOCUMENTS

| CN | 101415117 | 4/2009 |
| GB | 2449272 | 11/2008 |

(Continued)

OTHER PUBLICATIONS

Boschetti, A. et al, "High Dynamic Range Image Tone Mapping Based on Local Histogram Equalization," IEEE, 2010.

(Continued)

*Primary Examiner* — Amir Alavi (57) ABSTRACT

In a method to generate a tone-mapped image from a high-dynamic range image (HDR), an input HDR image is converted into a logarithmic domain and a global tone-mapping operator generates a high-resolution gray scale ratio image from the input HDR image. Based at least in part on the high-resolution gray scale ratio image, at least two different gray scale ratio images are generated and are merged together to generate a local multiscale gray scale ratio image that represents a weighted combination of the at least two different gray scale ratio images, each being of a different spatial resolution level. An output tone-mapped image is generated based on the high-resolution gray scale image and the local multiscale gray scale ratio image.

17 Claims, 7 Drawing Sheets

(51) Int. Cl.
*G06T 5/40* (2006.01)
*G06T 5/50* (2006.01)
*G09G 5/02* (2006.01)

(52) U.S. Cl.
CPC . *G06T 5/50* (2013.01); *G09G 5/02* (2013.01); *G06T 2207/10016* (2013.01); *G06T 2207/10024* (2013.01); *G06T 2207/20016* (2013.01); *G06T 2207/20072* (2013.01); *G06T 2207/20208* (2013.01); *G06T 2207/20221* (2013.01)

(56) References Cited

U.S. PATENT DOCUMENTS

| | | | |
|---|---|---|---|
| 7,433,514 | B2 | 10/2008 | Sloan |
| 7,486,299 | B2 | 2/2009 | Debevec |
| 7,636,496 | B2 | 12/2009 | Duan |
| 7,643,035 | B2 | 1/2010 | Toyama |
| 7,747,098 | B2 | 6/2010 | Ward |
| 8,218,625 | B2 | 7/2012 | Ward |
| 8,237,865 | B2 | 8/2012 | Salvucci |
| 8,514,934 | B2 | 8/2013 | Ward |
| 8,537,893 | B2 | 9/2013 | Efremov |
| 9,076,224 | B1* | 7/2015 | Shah ............ G06T 5/009 |
| 2009/0027558 | A1 | 1/2009 | Mantiuk |
| 2009/0041376 | A1 | 2/2009 | Carletta |
| 2009/0046207 | A1 | 2/2009 | Salvucci |
| 2009/0317017 | A1 | 12/2009 | Au |
| 2010/0157078 | A1 | 6/2010 | Atanassov |
| 2010/0166301 | A1 | 7/2010 | Jeon |
| 2010/0177203 | A1 | 7/2010 | Lin |
| 2010/0195901 | A1 | 8/2010 | Andrus |
| 2010/0328489 | A1* | 12/2010 | Bauer ............ H04N 5/2351 348/229.1 |
| 2013/0335438 | A1* | 12/2013 | Ward ............ G06T 5/40 345/589 |
| 2015/0030234 | A1* | 1/2015 | Lenseigne ........ G06T 7/0053 382/154 |
| 2015/0249832 | A1* | 9/2015 | Ten ............ G06T 5/009 382/243 |

FOREIGN PATENT DOCUMENTS

| | | |
|---|---|---|
| JP | 2007-121375 | 5/2007 |
| KR | 2010-0081886 | 7/2010 |
| WO | 2010/003692 | 1/2010 |
| WO | 2010/043922 | 4/2010 |
| WO | 2010/105036 | 9/2010 |

OTHER PUBLICATIONS

Duan, J. et al, "Tone-Mapping High Dynamic Range Images by Novel Histogram Adjustment," Elsevier Ltd., 2009.

Durand, F. et al, "Fast Bilateral Filtering for the Display of High-Dynamic Range Images," ACM Transactions on Graphics, Aug. 2002.

Farbman, Z. et al. "Edge-Preserving Decompositions for Multi-Scale Tone and Detail Manipulation", ACM Transactions on Graphics, vol. 27, No. 3, Aug. 11, 2008, pp. 1-10.

Fattal, R. et al, "Gradient Domain High Dynamic Range Compression," ACM Transactions on Graphics, Aug. 2002.

Ferradans, S. et al, "A Multi-Modal Approach to Perceptual Tone Mapping," Conference for CVMP, published in 2009, pp. 81-90.

Grave, J. et al. "A Tone-Mapping Operator for Road Visibility Experiments", ACM Transactions on Applied Perception, vol. 5, No. 2, May 1, 2008.

Khan, I. et al, "HDR Image Tone Mapping Using Histogram Adjustment Adapted to Human Visual System," IEEE, 2009.

Larson, G.W. et al, "A Visibility Matching Tone Reproduction Operator for High Dynamic Range Scenes," IEEE Transactions on Visualization and Computer Graphics, vol. 3, No. 4, Dec. 1997.

Ledda, P. et al, "Evaulation of Tone Mapping Operators Using a High Dynamic Range Display," Association for Computing Machinery, Inc., 2005.

Li, Y. et al, "Compressing and Companding High Dynamic Range Images with Subband Architectures," ACM Trans. on Graphics (Proceedings of ACM SIGGRAPH), Aug. 2005.

Pratt, W., "Digital Image Processing (Third Edition), Chapter 10 Image Enhancement," New York: John Wiley & Sons, US, pp. 243-296, 2001.

Reinhard, E. et al, "Photographic Tone Reproduction for Digital Images," ACM Transactions on Graphics, Aug. 2002.

Shan, Q., "Globally Optimized Linear Windowed Tone Mapping," IEEE Transactions on Visualization and Computer Graphics, vol. 16, Issue : 4 published in 2010 pp. 663-675.

Tumblin, J. et al. "LCIS: A Boundary Hierarchy for Detail-Preserving Contrast Reduction" SIGGRAPH 1999, Los Angeles, CA.

Vuylsteke, P. et al. "Multiscale Image Contrast Amplification" SPIE vol. 2167 Image Processing, 1994.

Ward, G. et al, "JPEG-HDR: A Backwards-Compatible, High Dynamic Range Extension to JPEG," Proceedings of the Thirteenth Color Imaging Conference, Nov. 2005.

Ward, G. et al, "Subband Encoding of High Dynamic Range Imagery," First Symposium on Applied Perception in Graphics and Visualization (APGV), Aug. 2004.

* cited by examiner

LOCAL MULTISCALE TONE-MAPPING OPERATOR

CROSS-REFERENCE TO RELATED APPLICATIONS

This application is a continuation of U.S. patent application Ser. No. 13/984,524, filed on Aug. 8, 2013, now U.S. Pat. No. 9,299,317 which is the national entry for PCT Application Ser. No. PCT/US2012/027267, filed on Mar. 1, 2012, which claims priority to U.S. Provisional Patent Application No. 61/448,606, filed on Mar. 2, 2011, all of which is incorporated herein by reference in their entirety.

TECHNICAL FIELD

The present invention relates generally to imaging processing, and in particular, to high dynamic range image processing.

BACKGROUND

Human vision may be capable of appreciating contrast ratios of up to 1:10,000 or more. Most conventional digital image formats (so-called 24-bit formats) use up to 24 bits to store both color and luminance information for each pixel in an image. Such formats may be called "output referred standards" because they do not attempt to preserve image information beyond what could be reproduced by legacy electronic displays of the types most commonly available in the past.

Display technologies being developed by the assignee, and others, are able to reproduce images having high dynamic range (HDR). Such displays can reproduce images that more faithfully represent real-world scenes than conventional displays.

To support backwards compatibility as well as new HDR display technologies, an HDR image may be represented by a tone-mapped image with additional metadata. On one hand, the tone-mapped image is used to present a normal dynamic range image (e.g., on a legacy display). On the other hand, the additional metadata may be used with the tone-mapped image to generate, recover, or present a HDR image (e.g., by a HDR display).

A few different tone mapped operators (TMOs) might be used to create tone-mapped images based on HDR images. Among these TMOs, the Reinhard global photographic operator is used to produce tone-mapped images relatively efficiently. However, the Reinhard operator suffers from the shortcoming of losing a relatively large amount of image details, particularly in bright areas. The bilateral filter is used to produce relatively high quality tone-mapped images. However, the computation cost for the bilateral filter is very high, possibly, sixty times of relatively simple TMOs such as the Reinhard operator. Other TMOs such as the histogram adjustment operator or the gradient domain operator were found not to work as well as those mentioned above.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE POSSIBLE EMBODIMENTS

Example possible embodiments, which relate to local multiscale tone mapping techniques, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily including, obscuring, or obfuscating the present invention.

Example embodiments are described herein according to the following outline:

1. GENERAL OVERVIEW
2. MULTISCALE LOCAL TONE MAPPING SYSTEM
3. MULTISCALE LOCAL TONE MAPPING OPERATOR
4. LOCAL MULTISCALE IMAGE PROCESSING METHOD
5. LOCAL MULTISCALE OPERATOR
6. EXAMPLE PROCESS FLOW
7. IMPLEMENTATION MECHANISMS—HARDWARE OVERVIEW
8. EQUIVALENTS, EXTENSIONS, ALTERNATIVES AND MISCELLANEOUS

1. General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

In some possible embodiments, an image format may be used to support HDR image rendering as well as non-HDR image rendering. Examples of image formats discussed herein may be JPEG, MPEG, AVI, TIFF, BMP, GIF, or other suitable formats. A particular example of such an image format is JPEG-HDR, used in place of JPEG to simultaneously support HDR image rendering on new HDR display devices and non-HDR image rendering on HDR or non-HDR display devices. JPEG-HDR stores a tone-mapped image in standard locations (e.g., in a bitstream, in a disc format, etc.) as defined in JPEG and store additional metadata in new locations that may be ignored by non-HDR display devices. The additional metadata may be used together with the tone-mapped image to generate/restore an HDR version of an original HDR image.

In some possible embodiments, additional metadata as described herein is a local multiscale gray scale ratio image derived from the original HDR image using techniques as described herein. In some possible embodiments, a color gamut such as the extended-YCC gamut may be used with the image format herein to enable full recovery at each pixel in the HDR version of the original HDR image, as generated/restored from the tone-mapped image and the local multiscale gray scale ratio image. In some possible embodiments, techniques as described herein minimize the number of fully black tone-mapped values in the tone-mapped image below a threshold (e.g., 0.01%, 0.1%, 1%, 2%, etc. of the total number of pixels in the tone-mapped image) to enable full recovery at each pixel in the HDR version of the original HDR image.

Under techniques herein, instead of using a global tone mapping (TM) operator that compresses global contrast in order to fit the desired output range of luminance values and loses local contrast that matters to human visual perception, local multiscale tone mapping processing may be used to generate the tone-mapped image that improves the local contrast that would have been compromised in a global TM operator, while leaving the overall mapping as it is. In some possible embodiments, the local multiscale TM processing uses a global curve (e.g., a histogram adjustment TM curve) to map luminance values without loss of detail. In some possible embodiments, the local multiscale TM processing is performed efficiently without generating/introducing new artifacts (such as halos) in the process. In a particular embodiment, efficient recursive processing is implemented to perform local multiscale processing as described herein with high computational efficiency. In a particular possible embodiment, the local multiscale processing only spends 30% longer time than TM processing by a global TM operator.

In some possible embodiments, an input HDR image is loaded and its luminance values are converted into the logarithmic domain. A histogram adjustment TM curve is computed and applied to the luminance values in order to determine a global ratio gray scale image. As used herein, a ratio image generally refers to an image comprising ratio values between luminance values in a pre-tone-mapping image (e.g., an input HDR image or its logarithmic equivalent) and luminance values in a post-tone-mapping image (e.g., a tone-mapped image or its logarithmic equivalent). In some possible embodiments, the ratio image is logically represented as the pre-tone-mapping image divided by the post-tone-mapping image at each pixel location in the non-logarithmic domain, or equivalently as the pre-tone-mapping image minus the post-tone-mapping image at each pixel location in the logarithmic domain. In some other possible embodiments, the ratio image is logically represented as the post-tone-mapping image divided by the pre-tone-mapping image at each pixel location in the non-logarithmic domain, or equivalently as the post-tone-mapping image minus the pre-tone-mapping image at each pixel location in the logarithmic domain. In all these embodiments, it should be noted that that the pre-tone-mapping image (e.g., a local multiscale TM image) may be obtained via simple algebraic operations (e.g., multiplications/divisions in the non-logarithmic domain; additions/subtractions in the logarithmic domain) if the ratio image (e.g., a local multiscale TM image) and the pre-tone-mapping image (e.g., an input HDR image) are known.

In some possible embodiments, in the logarithmic domain, the global ratio image that is used to generate other ratio images to be merged into the local multiscale ratio is computed efficiently by subtractions using 16-bit integer quantities. In some possible embodiments, a reference maximum over a tone-mapped image may be computed and the tone-mapped image may be modified so that no greater than a small percentage of pixels lie outside a supported color gamut (e.g., an extended-YCC color gamut).

In some possible embodiments, mechanisms as described herein form a part of a display system, including but not limited to a television, a laptop computer, netbook computer, cellular radiotelephone, electronic book reader, point of sale terminal, desktop computer, computer workstation, computer kiosk, various other kinds of terminals and display units, etc.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Multiscale Local Tone Mapping System

Figure 1A:
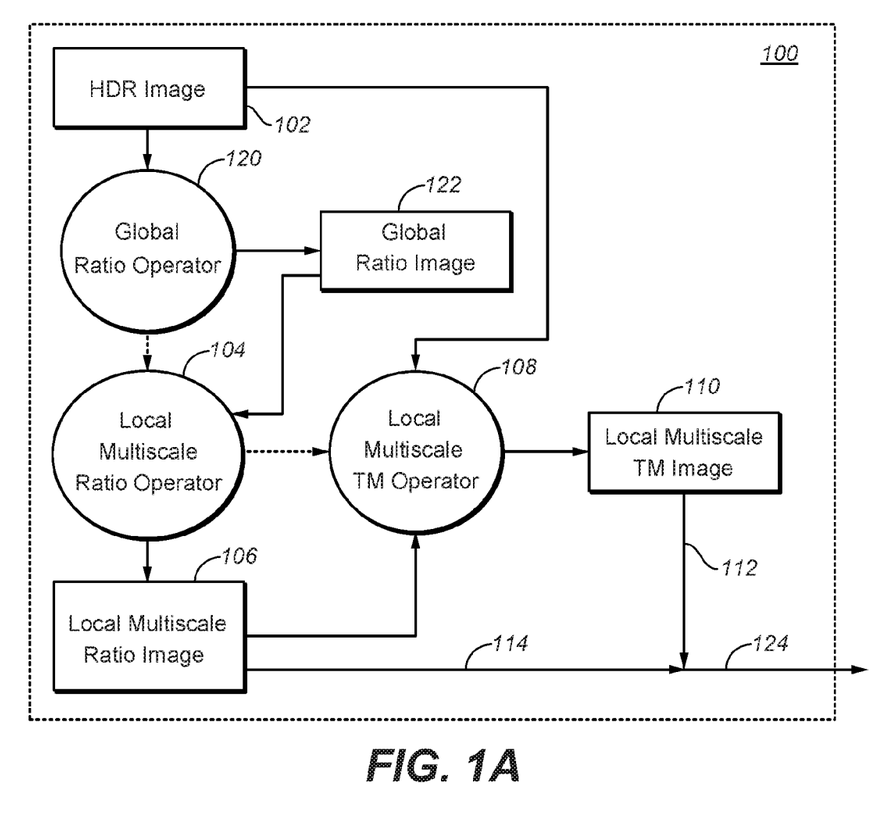
FIG. 1A illustrates an example local multiscale tone mapping system, in accordance with some possible embodiments of the present invention.

FIG. 1A illustrates an example local multiscale tone mapping system (100), in accordance with some possible embodiments of the present invention. In some possible embodiments, the local multiscale tone mapping system (100) may be configured with software and/or hardware components that implement local multiscale tone mapping processing that converts an input HDR image (e.g., 102) from an input format (e.g., an RGB format comprising floating point values) to an output format comprising a combination of a local multiscale tone-mapped (TM) image (e.g., 110) and a local multiscale ratio image (e.g., 106).

In some possible embodiments, the system (100) may comprise software and/or hardware components configured to extract or receive the input HDR image (102) from one of many possible input sources, which may include but are not limited to, the Internet, a storage medium (e.g., Blu-Ray DVD, hard disk, network access storage (NAS), etc.), over-the-air broadcast, satellite broadcast, cable, etc. The input HDR image (102) may or may not be a part of a sequence of input images such as a video stream. The system (100) may store/cache the input HDR image (102) in an internal random access fast memory space or another type of available memory space.

In some possible embodiments, the system (100) may comprise a global ratio operator (e.g., 120) configured to generate, based on the input HDR image (102), a global ratio image (e.g., 122). The system (100) may store/cache the global ratio image (122) in an internal random access fast memory space. In some possible embodiments, the global ratio operator (120) may correspond with a global tone mapper (which may be implemented in the form of function, distribution, curve, data table, etc.), e.g., a global histogram adjustment TM operator. For the purpose of the present invention, other global TM operators such as the Reinhard operator, etc. may be used, instead of or in conjunction with the global histogram adjustment TM operator, as the global tone mapper with which the global ratio operator (120) may correspond. In some possible embodiments, the spatial resolution level of the global ratio image (122) may be, but is not limited to, the same as the spatial resolution level of the input HDR image. As used herein, a spatial resolution level refers to the highest sharpness level an image is configured to express, and may be indicated with the number(s) of independent pixels in one or more spatial dimensions. Thus, an image of a low spatial resolution level, when upsampled or blurred to larger spatial dimensions, remains at the same low spatial resolution level.

In some possible embodiments, the system (100) may comprise a local multiscale ratio operator (e.g., 104). The local multiscale ratio operator (104) may generally comprise software and/or hardware configured to receive a global ratio image (e.g., 122), to perform a local multiscale ratio operation on the global ratio image (122) and to generate, based on the global ratio image (122), the local multiscale ratio image (106).

In some possible embodiments, the system (100) may comprise a local multiscale tone mapping (TM) operator (e.g., 108). The local multiscale TM operator (108) may generally comprise software and/or hardware configured to perform a local multiscale tone mapping operation using the HDR image (102) and the local multiscale ratio image (106) as input, and to generate, based on the HDR image and the local multiscale ratio image (106), the local multiscale TM image (110) as output.

In some possible embodiments, the system (100) may be configured with software and/or hardware components to provide the local multiscale TM image (110) and/or local multiscale ratio image (106) to other devices and/or other components within or without the system (100). In an example, the system (100) may provide the local multiscale TM image (110) in a first output (e.g., 112) and the local multiscale Ratio image (106) in a second output (e.g., 114). As used herein, the first output (112) and the second output (114) may be physical or logical. In an example, two separate data paths may be used to carry the two outputs (112 and 114). In another example, a single data path (e.g., 124) may be used to carry the two outputs (112 and 114). For instance, the two first and second outputs (112 and 114), or the local multiscale ratio and TM images (106 and 110) therein, may be encoded in a single bitstream with a logical structure from which each of the local multiscale ratio and TM images (106 and 110) may be decoded/retrieved.

In some possible embodiments, only one of the local multiscale ratio and TM images (106 and 110) may be provided by the system (100). In an example, the system (100) may be configured to provide only the local multiscale TM image (110) to a non-HDR display device. In some possible embodiments, the system (100) may be configured to provide either (1) only the local multiscale TM image (110) or (2) both the local multiscale ratio and TM images (106 and 110) to an HDR display device. In some possible embodiments, the local multiscale ratio and TM images (106 and 110) from the system (110) may be stored/transmitted through a tangible medium (e.g., a disc, an Internet-based server, NAS, storage medium, etc.) from which a display device may choose which image or combination of images to decode/retrieve.

3. Multiscale Local Tone Mapping Operator

Figure 1B:
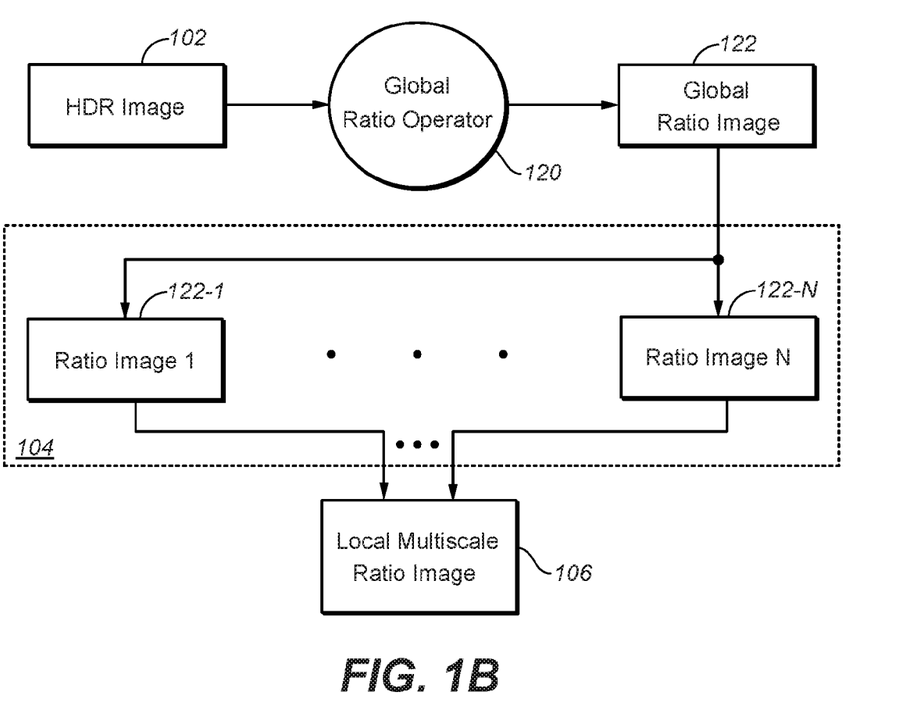
FIG. 1B is a block diagram illustrating an example local multiscale ratio operator, in accordance with some possible embodiments of the present invention.

FIG. 1B is a block diagram illustrating an example local multiscale ratio operator (e.g., 104), in accordance with some possible embodiments of the present invention.

In some possible embodiments, the local multiscale ratio operator (104) may generally comprise software and/or hardware components configured to create, based on the global ratio image (122), a set of ratio images which comprise ratio image 1 (122-1), . . . and ratio image N (122-N), wherein N is a positive integer greater than one (1) indicating the number of different ratio images in the set. In some possible embodiments, the set of ratio images comprise at least two different ratio images with different spatial resolution levels. In some possible embodiments, the global ratio image (122) is included as a member in the set of ratio images. In some other possible embodiments, the global ratio images (122) is not included as a member in the set of ratio images. In an example, the set of ratio images comprises the global ratio image (122) and one or more other ratio images (which may include, for example, 122-N). The global ratio image (122) may be at a spatial resolution level same as the spatial resolution level of the input HDR image, while at least one of the one or more other ratio images may be at a lower spatial resolution level (e.g., twice (2×), four times (4×), eight times (8×), etc., coarser in one or more spatial dimensions) than that of the input HDR image. In another example, the set of ratio images comprises two or more ratio images, none of which is the global ratio image (122). One (e.g., 122-1) of the two or more ratio images may be at a first lower spatial resolution level (e.g., twice (2×), four times (4×), eight times (8×), etc., coarser in one or more spatial dimensions) than that of the input HDR image, while at least one other of the two or more ratio images may be at a second different lower spatial resolution level (e.g., four times (4×), eight times (8×), sixteen times (16×), etc., coarser in one or more spatial dimensions) than that of the input HDR image.

In some possible embodiments, the local multiscale ratio operator (104) may generally comprise software and/or hardware components configured to generate, directly or indirectly based on the global ratio image (122), each ratio image in the set of ratio images that is not the global ratio image (122) itself. As used herein, "generate a specific ratio image directly based on the global ratio image" means that an operation is directly performed on the global ratio image (e.g., 122) to generate the specific ratio image, while "generate a specific ratio image indirectly based on the global ratio image" means that an operation is directly performed on an intermediate ratio image—rather than directly performed on the global ratio image—that may have been generated indirectly or directly based on the global ratio image (e.g., 122) to generate the specific ratio image. In some possible embodiments, operations performed on the global ratio image or intermediate ratio images as described herein may be downsampling operations, upsampling operations, multiplications/divisions in a non-logarithmic domain (or additions/subtractions in a logarithmic domain), power raising or lowering operations in a non-logarithmic domain (or multiplications/divisions in a logarithmic domain), etc.

In some possible embodiments, the local multiscale ratio operator (104) may generally comprise software and/or hardware components configured to merge ratio images in the set of ratio images into a local multiscale ratio image (e.g., 106). In some possible embodiments, the set of ratio images is ordered in a succession from the highest spatial resolution level to the lowest spatial resolution level. In some possible embodiments, one or more ratio images with one or more higher spatial resolution levels (e.g., preceding ratio images) is used to generate a ratio image (e.g., a succeeding ratio image) with a spatial resolution level no more than the one or more higher spatial resolution levels.

In some possible embodiments, each ratio image in the set of ratio images is separately cached or stored in a memory space before that ratio image is merged into the local multiscale ratio image (106). In some other possible embodiments, each ratio image in the set of ratio images exists in logical sense, but a succeeding ratio image may be merged and cached with the merged results of all its preceding ratio images before other succeeding ratio images are further generated.

4. Local Multiscale Image Processing Method

Figure 2:
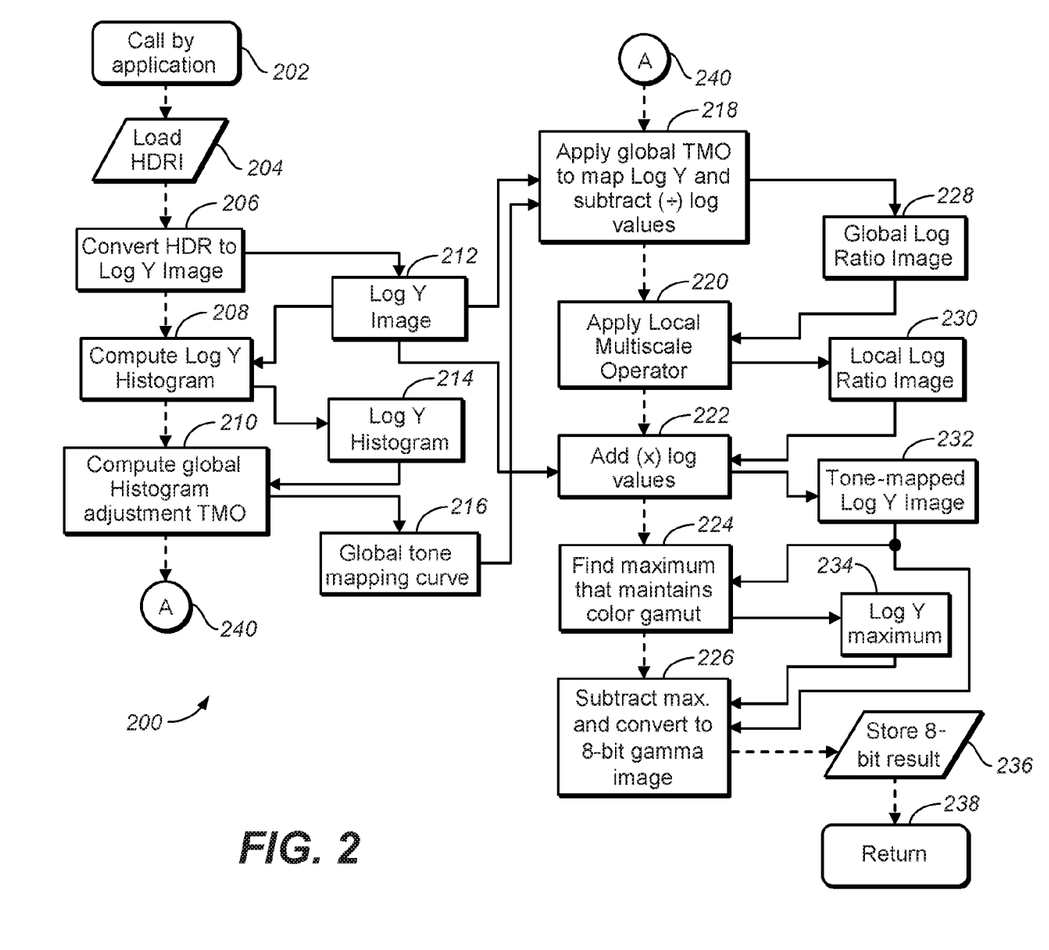
FIG. 2 shows a block diagram depicting an example local multiscale image processing method, in accordance with some possible embodiments of the present invention.

FIG. 2 shows a block diagram depicting an example local multiscale image processing method (200), in accordance with some possible embodiments of the present invention. The solid arrows in FIG. 2 indicate data flows, while the broken arrows indicate control flows. The method (200) may be performed by one or more computing devices.

In step 202, the local multiscale image processing method (200) may be called from an application, which may, but is not limited to, be related to displaying an HDR image onto a standard dynamic range (SDR) display. In step 204, the method (200) may load an input HDR image (e.g., 102) into a memory space. The input HDR image (102) may be a floating-point RGB image, while the output tone-mapped gray scale image from the method (200) may be an 8-bit grayscale image of the same dimensions that indicates tone-mapped luminance values, e.g., in a gamma-encoding scale ($\gamma$=2.2), as a part of a local multiscale tone-mapped image (e.g., 110).

In step 206, the input HDR image may be converted into an HDR image with logarithmic luminance (denoted as "Log Y") values (in a color space which may be related to a Yuv color space, or another color space that comprises a luma channel in addition to chroma related channels). For simplicity, the HDR image with logarithmic luminance values may be referred to herein as an HDR image in the Log Y domain (212). As used herein, luminance values may refer to luminance values, luma values, or gamma-expanded or—compressed luminance values. In step 208, the method (200) may compute a Log Y histogram based on the logarithmic luminance values of the HDR image in the Log Y domain, producing a Log Y histogram (214). In step 210, the method (200) may perform computations based on the Log Y histogram (214) and generate a global tone mapping curve (216), which may be used in tone mapping or ratio operations by a global histogram adjustment tone mapping operator (TMO) or directly or indirectly by a global ratio operator (e.g., 120) that may correspond with the global histogram adjustment TMO.

The operation flow of the method (200) at this point may reach a reference point A (240), which leads to step 218. In step 218, the method may apply the global histogram TMO as based on the global tone mapping curve (216) to map Log Y values in the Log Y image (212) into global tone-mapped values in the Log Y domain and subtract the Log Y values in the HDR image in the Log Y domain with the global tone-mapped values to generate a global ratio image (e.g., 122) in the Log Y domain, which may be referred to herein as a global Log ratio image (228).

In step 220, the method (200) may apply a local multiscale ratio operator (e.g., 300 of FIG. 3) to the global Log ratio image (228) to generate a local multiscale ratio image (e.g., 106), which may be referred to as a local Log ratio image (230). In some possible embodiments, the local multiscale ratio operator may be the same as or a part of the local multiscale ratio operator 104 as illustrated in FIG. 1A and FIG. 1B. In some possible embodiments, the local multiscale operator may create a set of ratio images (e.g., 122-1 through 122-N) and merge the ratio images into the local Log ratio image (230), as will be further explained in detail with reference to FIG. 3.

In step 222 the Local Log Ratio image (230) is combined with the Log Y image (212) to generate a Tone mapped Log Y image 232. The combination can be either an addition in the Log domain or a multiplication in the linear domain. In some possible embodiments, the ratio operation performed in step 218 may be a subtraction in the Log domain (which may be a division operation in a non-logarithmic domain), while the operation performed by the local multiscale TM operator (220) in step 222 may be an inverse operation (e.g., addition in the Log domain, which may be a multiplication operation in the non-logarithmic domain).

In step 224, the method (200) may find/compute, over the tone-mapped Log Y image (232), a reference maximum luminance value (which may be referred to as a Log Y maximum 234). Luminance values below the reference maximum luminance value, as combined with corresponding chroma values derived from the input HDR image, may maintain within a particular color gamut supported by a wide variety of display devices including non-HDR display devices. The reference maximum luminance value over the image may be so chosen that no greater than some small percentage of pixels exceeds the color gamut.

In step 226, the method (200) may subtract the Log Y maximum luminance value (234) from the luminance values in the tone-mapped Log Y image and convert the luminance values in the tone-mapped Log Y image, as subtracted by the Log Y maximum luminance value (234), into fixed point values (e.g., a 8-bit result). In step 236, luminance values in the 8-bit result may be stored in a corrected tone-mapped gray scale tone-mapped image to be used together with chroma values derived from the HDR image as a (colored) tone-mapped image. In some possible embodiments, the corrected tone-mapped gray scale tone-mapped image is returned to the calling application in step 238.

5. Local Multiscale Ratio Operator

Figure 3:
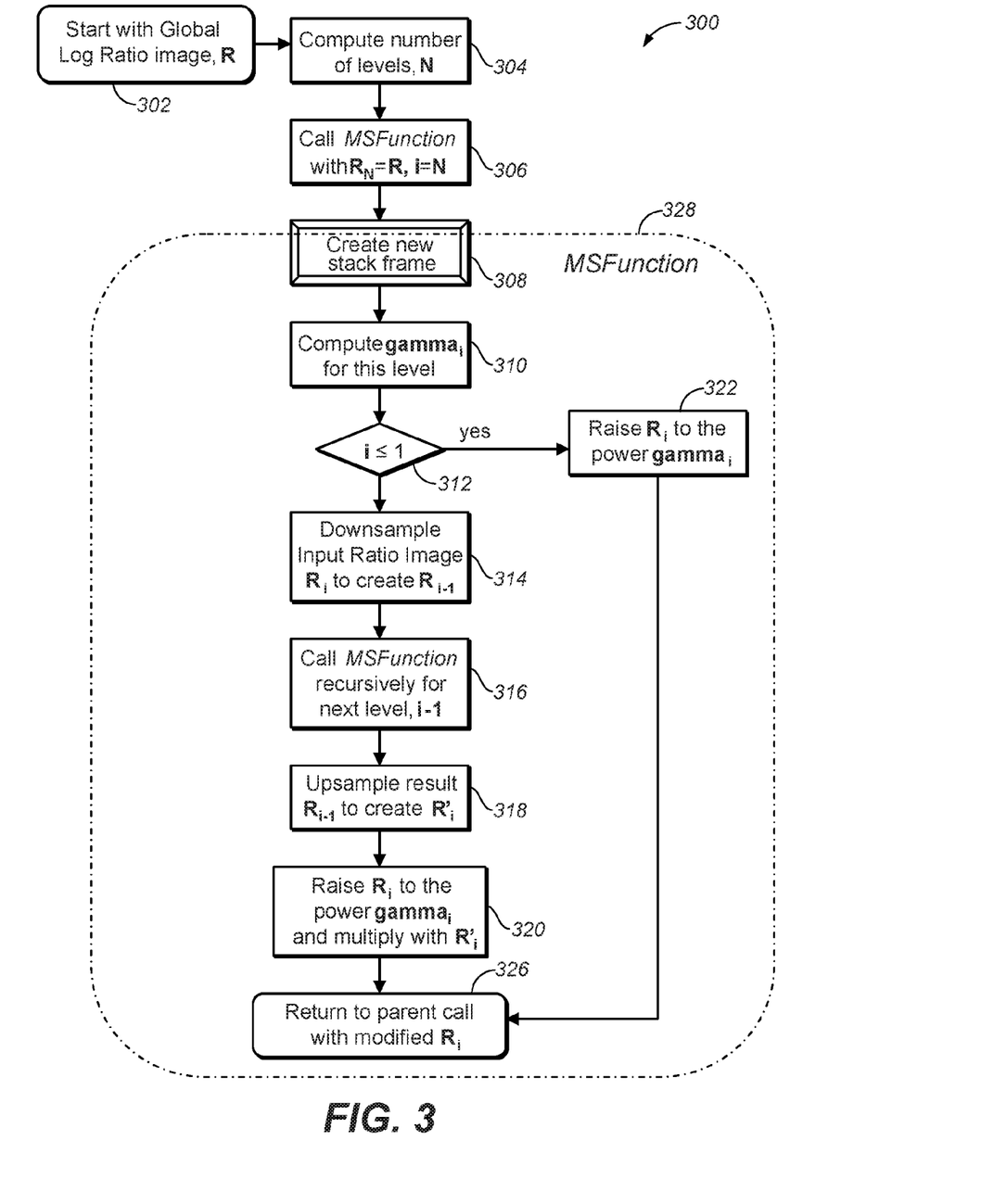
FIG. 3 shows a block diagram depicting an example local multiscale (ratio) operator, in accordance with some possible embodiments of the present invention.

FIG. 3 shows a block diagram depicting an example local multiscale ratio operator (e.g., 220 of FIG. 2 or 104 of FIG. 1A), in accordance with some possible embodiments of the present invention. The local multiscale ratio operator (220) may implement a processing flow (300) performed by one or more computing devices.

In block 302, the local multiscale operator (202) may start with receiving a global Log ratio image (e.g., 228), denoted herein as R. As used herein, a "ratio value" may refer to a luminance ratio value. A "ratio image" herein may refer to a gray scale ratio image comprising luminance ratio values. In block 304, the operator (220) may compute a number of spatial resolution levels, N. For the purpose of the present invention, "computing N" may also include directly setting N to a positive constant integer value of 2, 3, 4, 5, 6, etc. In some possible embodiments, the spatial resolution level of the global Log ratio image (228) is used as a factor in computing N. For the purpose of illustration only, the global Log ratio image (228) may be, but is not limited to, a rectangular image frame with Dx (e.g., 2048, etc.) pixels in a horizontal dimension and Dy (e.g., 1536, etc.) pixels in a vertical dimension. Thus, the spatial resolution level of the global Log ratio image (228), or that of the input HDR image (102), may be characterized with a total number Dx times Dy of pixels in the image frame.

In some possible embodiments, to compute the total number of spatial resolution levels, N, the spatial resolution level of the global Log ratio image (228) is successively reduced by a factor of a positive integer, $m_x*m_y$ (where * denotes a multiplication operation), up to a point at which a further reduction of spatial resolution level would cause the resultant spatial resolution level below a minimum spatial resolution level. Here, $m_x$ may be a positive integer indicating the number of pixels along the horizontal dimension in a (preceding) ratio image becomes one pixel along the horizontal dimension in a succeeding ratio image immediately following the preceding ratio image; $m_y$ may be a positive integer indicating the number of pixels along the vertical dimension in the (preceding) ratio image becomes one pixel along the horizontal dimension in the succeeding ratio image immediately following the preceding ratio image. As used herein, the minimum spatial resolution level may refer to a spatial resolution level preconfigured and/or programmatically configured that is below the spatial resolution level of the global Log ratio image (228); the lowest value the minimum spatial resolution level may take may be no less than one (1) pixel in any of the spatial dimensions of the global Log ratio image (228).

In some possible embodiments, a maximum number of supportable spatial resolution levels along each of the spatial dimensions of the global Log ratio image (228) is first determined.

For example, the maximum number of levels, Nx, supported by the illustrated resolution in the horizontal dimension may be computed as the largest value satisfying the following expression:

$$m_x^{Nx} \leq Dx \qquad \text{expression (1)}$$

Similarly, the maximum number of levels, Ny, supported by the illustrated resolution in the vertical dimension may be computed as the largest value satisfying the following expression:

$$m_y^{Ny} \leq Dy \qquad \text{expression (2)}$$

In some possible embodiments, N is set to any positive integer that is greater than one (1) and is no greater than both the maximum values of Nx and Ny computed from expressions (1) and (2).

In some possible embodiments, N is set to a positive integer value greater than one (1) so the smallest spatial resolution level at the top of a pyramid of the ratio images (which are obtained by successively reducing the resolution of a preceding ratio image starting from the global Log ratio image (228)) is at least 1 pixel wide in each dimension.

For the purpose of the present invention, other ways of computing N may be used. For example, instead of using constants $m_x$ and $m_y$, $m_x$ and $m_y$ may be set to different values at two or more different spatial resolution levels. In some possible embodiment, N may be set to a preconfigured or user configurable value; the spatial resolution levels may be determined based at least in part on the preconfigured or user configurable value of N. In some possible embodiments, N and/or one or more of the spatial resolution levels is determined without performing image analysis on the content of the input HDR image (102), or the global Log ratio image (228), or a preceding ratio image that is used to deduce the present ratio image. In some other possible embodiments, image analysis may be performed on the content of one or more the foregoing images; N and/or one or more of the spatial resolution levels may be determined, based at least in part on the result of the image analysis. In various possible embodiments, $m_x$ and $m_y$ may be constant or may vary with levels, or may even vary with locations within the image frame of the input HDR image (102). In various possible embodiments, location dependency may or may not come from the result of the image analysis.

In some possible embodiments, in block 306, the operator (220) calls a multiscale function, denoted as MSFunction (328), which has calling parameters $R_i$ and i initially set to R and N respectively, where the calling parameter i may be an index corresponding to a spatial resolution level. In some possible embodiments, R is the global ratio image (122). In some possible embodiments, the MSFunction (328) is implemented as illustrated in FIG. 3.

In block 308, the operator (220) may create a new stack frame at the spatial resolution level as indicated by i. This stack frame is used to store ratio values at the spatial resolution level corresponding to i. In some possible embodiments, a stack frame as described herein holds a number of pixels that correspond to the spatial resolution level to store ratio values (e.g., in the logarithmic domain) at the spatial resolution level.

In block 310, the operator (220) may compute $gamma_i$ (or $\gamma_i$) for spatial resolution level i, where $gamma_i$, is a gamma value (which is a power value in the non-logarithmic domain and a multiplicative value in the logarithmic domain) for spatial resolution level i. In some possible embodiments, a value (e.g., 1/N, etc.) that does not depend on the value of i is assigned to $gamma_i$. In some other possible embodiments, a value that depends on the value of i may be assigned to $gamma_i$. In a particular possible embodiment, $gamma_i$, may be given as follows:

$$gamma_i = 2*i/(N*(N+1)) \qquad \text{expression (3)}$$

Thus, in this embodiment, the higher the spatial resolution level is, the larger the value of $gamma_i$.

In some possible embodiments, the sum of gamma's for all the levels is, but is not limited to in other possible embodiments, be constrained to a fixed value, for example, one (1). In some possible embodiments, such a constraint on gamma's is used to maintain the desired dynamic range of a corresponding output tone-mapped image within a specific range, for example, supported by a particular range of display devices.

In block 312, the operator (220) may test whether i is less than or equal to a minimum number (e.g., one (1)), which may correspond to the lowest spatial resolution level in the N spatial resolution levels as discussed. If so, the processing flow (300) leads to block 322; otherwise, the processing flow (300) leads to block 314. Initially, since i is set to N, which is greater than one (1), the processing flow leads to block 314. In block 314, the operator (220) may downsample one of the input parameters for MSFunction (328), namely ratio image $R_i$ to $R_{i-1}$. In various possible embodiments, downsampling of $R_i$ to $R_{i-1}$ may be performed in one of many different ways. In an example, if $m_x*m_y$ pixels of $R_i$ is to become one pixel in $R_{i-1}$, the pixel in $R_{i-1}$ may be chosen as a mean value of the pixels in $R_i$, or some other representative value, which may depend on ratio values of the $m_x*m_y$ pixels in $R_i$. In another example, a filter such as a Gaussian filter may be applied to the pixel values in $R_i$ to obtain the pixel in $R_{i-1}$.

In block 316, the operator (220) may call MSFunction (328), recursively, with parameters $R_i$ and i now set to $R_{i-1}$ and (i−1) respectively. Blocks 310, 312, 314, and 316, as described above, may be repeated (or recursively called) until i is no longer above the minimum value (e.g., one (1)). When i is less or equal to the minimum value (e.g., 1), the processing flow leads to block 322.

In block 322, the operator (220) may raise (each of the ratio values in) $R_i$ to a power $gamma_i$, which may be accomplished with a multiplication operation on ratio values in the logarithmic domain, as follows:

$$R_i := gamma_i * R_i \qquad \text{expression (4)}$$

In some possible embodiments, this power raising operation is performed for every ratio value in $R_i$.

In block 326, the operator (220) may return the final modified $R_i$, to the parent caller (e.g., 306 or 316), as given in expression (4).

In block 318, the operator (220) may upsample the ratio values in $R_{i-1}$ to create $R_i'$.

In block 320, the operator (220) may raise (each ratio value in) $R_i$ to a power $gamma_i$, and multiply with $R_i'$ to generate a modified $R_i$ at level i. Note that in the logarithmic domain, raising $R_i$ to a power $gamma_i$, corresponds to a simple multiplication of $R_i * gamma_i$, and multiplication corresponds to addition. Or, $$R_i := R_i + gamma_i * R_i \qquad \text{expression (5)}$$

Thus, $R_i$ in (320) can be considered as the sum of weighted local ratio images, where, in one embodiment, the weight factors correspond to the $gamma_i$, values in each of the iterations. The power raising operation may be performed for every ratio value in $R_i$. The multiplication operation may be performed for every pair of ratio values in the spatial position in $R_i$ and $R_i'$.

In block 326, the operator (220) may return the modified $R_i$ to the parent caller. At the final iteration level, the modified $R_i$ may be returned as the Local Log Ratio image (230 of FIG. 2).

For the purpose of illustration, it has been described that a local multiscale ratio image may be generated with a (recursive) processing flow of FIG. 3. It should be noted that for the purpose of the present invention, a local multiscale ratio image may be generated with a different processing flow. For example, instead of using recursive processing, an iterative function or another type of processing flow may be used. These and other types of processing flows used to generate a local multiscale ratio image are within the scope of the present invention.

6. Example Process Flow

Figure 4A:
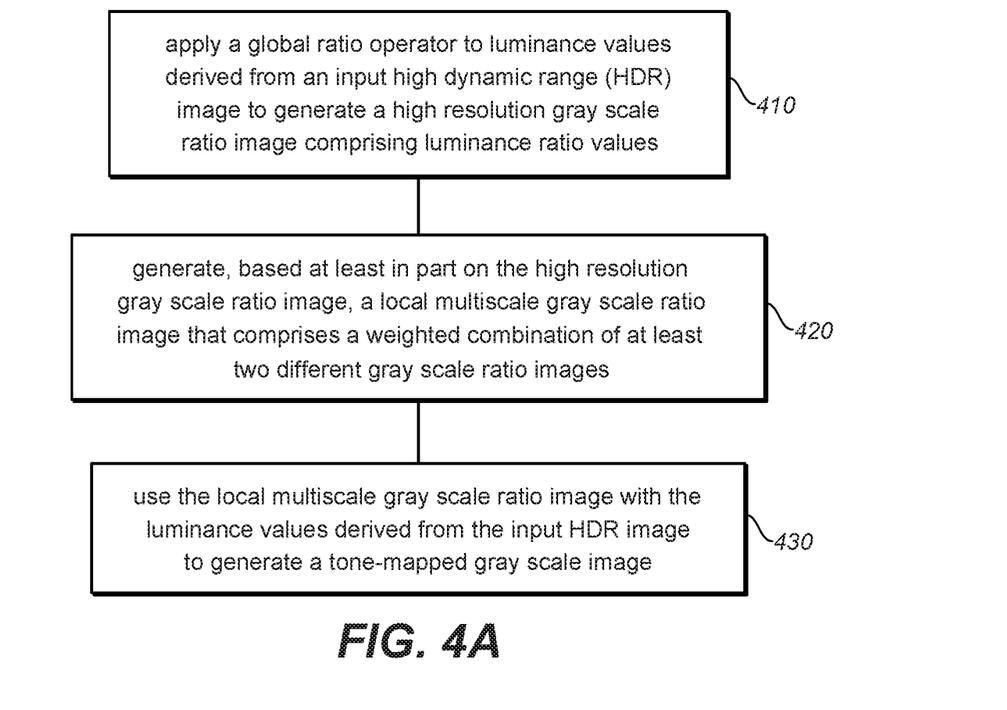
FIG. 4A and FIG. 4B illustrate example process flows, according to possible embodiments of the present invention.

FIG. 4A illustrates an example process flow according to a possible embodiment of the present invention. In some possible embodiments, one or more computing devices or components such as an image processing unit may perform this process flow. In block 410, the image processing unit may apply a global ratio operator to luminance values derived from an input high dynamic range (HDR) image to generate a high resolution gray scale ratio image comprising luminance ratio values. In some possible embodiments, the high resolution ratio gray scale image is a gray scale ratio image with a spatial resolution level same as that of the HDR image. In some possible embodiments, the image processing unit first converts the luminance values in the input HDR image into a logarithmic domain.

In some possible embodiments, the global ratio operator comprises a global luminance histogram adjustment operator in connection with a global tone mapping operator. In some possible embodiments, the image processing unit computes, based on the luminance values derived from the input HDR image, a histogram adjustment curve and may apply the histogram adjustment curve to the luminance values derived from the input HDR image to generate the high resolution gray scale ratio image.

In some possible embodiments, in a non-logarithmic domain, the luminance ratio values in the high resolution gray scale ratio image comprise a plurality of ratio values each of which is a globally tone-mapped luminance value of a global tone-mapped image as divided by one of the luminance values derived from the input HDR image.

In block 420, the image processing unit may generate, based at least in part on the high resolution gray scale ratio image, a local multiscale gray scale ratio image that comprises a weighted combination of at least two different gray scale ratio images, each being of a different spatial resolution level. As used herein, a "weighted combination" means an additive sum in the logarithmic domain, but multiplicative product in the non-logarithmic domain; weight factors used in the weighted combination may be gamma values, which are multiplicative factors in the logarithmic domain, or exponential factors in the non-logarithmic domain).

In some possible embodiments, the image processing unit assigns at least two weighting factors to the at least two different gray scale ratio images. In some possible embodiments, the image processing unit assigns values of a plurality of weighting factors to a plurality of gray scale ratio images that are used to generate the local multiscale gray scale ratio image. In some possible embodiments, the plurality of gray scale ratio images includes the at least two gray scale ratio images. In some possible embodiments, the values of the plurality of weighting factors are normalized to a preconfigured value. In some possible embodiments, the image processing unit assigns at least two weighting factors to the at least two different gray scale ratio images.

In some possible embodiments, the image processing unit assigns a first value to a first weight factor for a first gray scale ratio image in a plurality of gray scale ratio images that are used to generate the local multiscale gray scale ratio image, and may assign a second value to a second weight factor for a second gray scale ratio image in the plurality of gray scale ratio images. In some possible embodiments, the first value is higher than the second value; the first gray scale ratio image has a higher spatial resolution level than the second gray scale ratio image.

In some possible embodiments, the at least two different gray scale ratio images include the high resolution gray scale ratio image. In some possible embodiments, the at least two different gray scale ratio images include at least one gray scale ratio image determined based on the high resolution gray scale ratio image by downsampling luminance ratio values in the high resolution gray scale ratio image.

In block 430, the image processing unit may use ratio values in the local multiscale gray scale ratio image with the luminance values derived from the input HDR image to generate a tone-mapped gray scale image. In some possible embodiments, tone-mapped luminance values in the tone-map gray scale image comprise a reduced dynamic range lower than that of the luminance values in the input HDR image. In some possible embodiments, tone-mapped luminance values in the tone-mapped gray scale image are in a gamma-encoding scale.

In some possible embodiments, the input HDR image is a floating-point RGB image. In some other possible embodiments, the input HDR image is a fixed-point (e.g., 16 bits for each R, G, or B channel) RGB image. In some possible embodiments, the tone-mapped gray scale image comprises a fixed-point grayscale image with spatial dimensions same as spatial dimensions of the input HDR image.

In some possible embodiments, the image processing unit computes a reference maximum over the tone-mapped gray scale image such that a percentage of pixels that go out of a color gamut is not more than a threshold.

In some possible embodiments, the local multiscale gray scale ratio image is obtained using recursive processing.

In some possible embodiments, the tone-mapped gray scale image derived from the local multiscale gray scale ratio image and the input HDR image is used as a component image to derive a tone-mapped color image. In an example, the tone-mapped color image without the local multiscale gray scale ratio image may be used for rendering on an image rendering device.

In another example, the tone-mapped color image with the local multiscale gray scale ratio image may be provided to an image processing system for rendering on an image rendering device. In some possible embodiments, the tone-mapped color image and the local multiscale gray scale ratio image are used by the image processing system to generate an output HDR image.

Figure 4B:
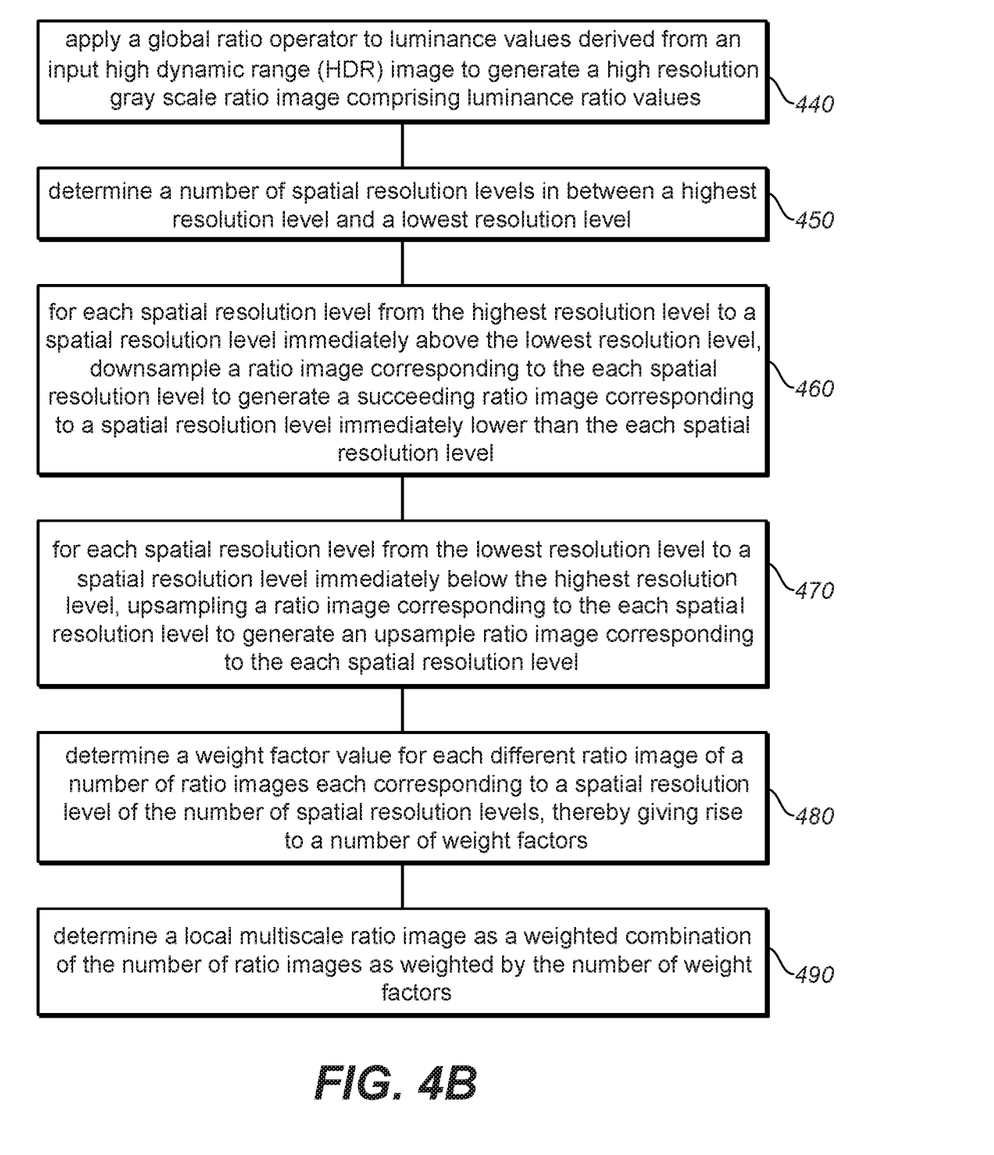

FIG. 4B illustrates an example process flow according to a possible embodiment of the present invention. In some possible embodiments, one or more computing devices or components such as an image processing unit may perform this process flow. In block 440, the image processing unit may apply a global tone mapping operator to luminance values derived from a high dynamic range (HDR) image to generate a high resolution gray scale ratio image comprising luminance ratio values.

In block 450, the image processing unit may determine a number of spatial resolution levels in between a highest resolution level and a lowest resolution level. In some possible embodiments, the number of spatial resolution levels is determined without performing image analysis over the content of the input HDR image. In some possible embodiments, the number of spatial resolution levels is determined based at least in part on a result of image analysis content of the input HDR image.

In block 460, the image processing unit may downsample, for each spatial resolution level from the highest resolution level to a spatial resolution level immediately above the lowest resolution level, a ratio image corresponding to each spatial resolution level to generate a succeeding ratio image corresponding to a spatial resolution level immediately lower than each spatial resolution level.

In block 470, the image processing unit may upsample, for each spatial resolution level from the lowest resolution level to a spatial resolution level immediately below the highest resolution level, a ratio image corresponding to each spatial resolution level to generate an upsample ratio image corresponding to each spatial resolution level;

In block 480, the image processing unit may determine a weight factor value for each different ratio image of a number of ratio images, thereby giving rise to a number of weight factors. Here, each of the ratio images may correspond to a spatial resolution level of the number of spatial resolution levels.

In block 490, the imaging processing unit may determine a local multiscale ratio image as a weighted combination of the number of ratio images as weighted by the number of weight factors.

7. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
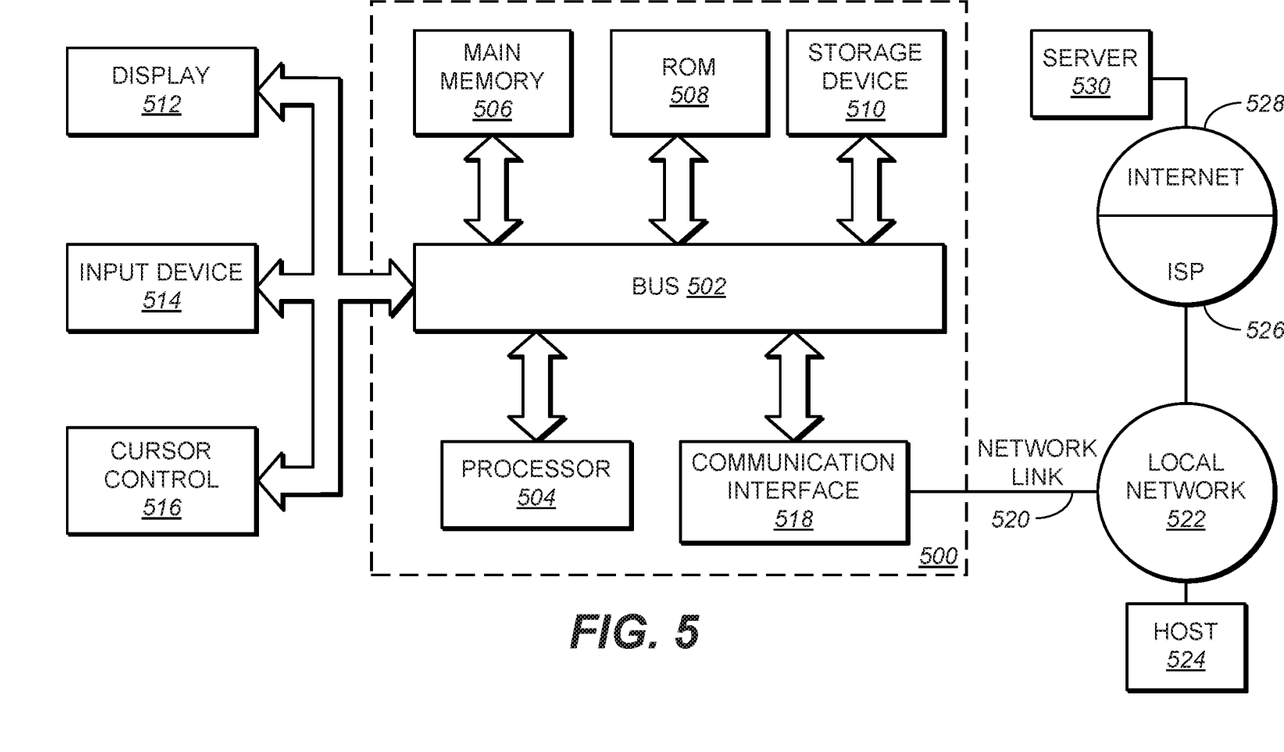
FIG. 5 illustrates an example hardware platform on which a computer or a computing device as described herein may be implemented, according a possible embodiment of the present invention.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502.

Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. Equivalents, Extensions, Alternatives and Miscellaneous

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for local tone mapping, the method comprising:
   receiving an input high dynamic range (HDR) image (204);
   converting luminance values in the input HDR image into a logarithmic domain to generate a logarithmic input image (212);
   applying a global tone-mapping operator (216) to the logarithmic input image to generate a logarithmic global tone-mapped image;
   generating a high resolution (HR) ratio image (228) based on the luminance values of the global tone-mapped image and the input HDR image;
   generating based on the HR ratio image at least two different scale ratio images, each being of a different spatial resolution level (220);
   merging the at least two different scale ratio images to generate a local multiscale ratio image that comprises a weighted combination of the at least two different scale ratio images, wherein the local multiscale ratio image is obtained using recursive processing; and
   adding (222) the local multiscale ratio image to the logarithmic input image to generate pixel values of a luminance output tone-mapped image in the logarithmic domain (232).

2. The method of claim 1, further comprising:
   converting (226) the pixel values of the luminance output tone-mapped image from the logarithmic domain into the linear domain and combining the converted linear luminance output tone-mapped values with chroma values of the input HDR image to generate a color output tone-mapped image (236).

3. The method of claim 1, further comprising:
   computing (224) a reference maximum luminance value (Log Y max 234) based on the pixel values of the luminance output tone-mapped image;
   subtracting (226) the reference maximum luminance value from pixels values in the luminance output tone-mapped image to generate a gamut-corrected luminance tone-mapped image;

converting (226) the luminance values of the gamut-corrected luminance tone-mapped image from the logarithmic domain into the linear domain; and combining the converted linear gamut-corrected luminance tone-mapped values with chroma values of the input HDR image to generate a color output tone-mapped image.

4. The method of claim 1, wherein the global tone-mapping operator is computed based on a global luminance histogram (214).

5. The method of claim 1, wherein the at least two different scale ratio images include the HR ratio image.

6. The method of claim 1, wherein the HR ratio image is a grayscale ratio image with a same spatial resolution level as that of the input HDR image.

7. The method of claim 1, wherein the at least two different scale ratio images include at least one scale ratio image determined based on the HR ratio image by downsampling luminance ratio values in the HR ratio image.

8. The method of claim 1, wherein luminance values in the global tone-mapped image comprise a dynamic range lower than the dynamic range of the luminance values in the input HDR image.

9. The method of claim 1, further comprising:
computing, based on the luminance values derived from the input HDR image, a histogram adjustment curve; and applying the histogram adjustment curve to the luminance values derived from the input HDR image to generate the HR ratio image.

10. The method of claim 1, wherein computing the HR ratio image in the logarithmic domain comprises subtracting luminance values of the logarithmic input image from luminance values of the logarithmic global tone-mapped image.

11. The method of claim 1, wherein, in a non-logarithmic domain, the luminance ratio values in the HR ratio image comprise a plurality of ratio values each of which is a globally tone-mapped luminance value of a global tone-mapped image as divided by one of the luminance values derived from the input HDR image.

12. The method of claim 1, further comprising assigning at least two weighting factors to the at least two different scale ratio images.

13. The method of claim 1, further comprising:
assigning values of a plurality of weighting factors to a plurality of scale ratio images that are used to generate the local multiscale scale ratio image, wherein the plurality of scale ratio images includes the at least two scale ratio images.

14. The method of claim 13, further comprising the sum of all the weighting factors adds to 1.

15. The method of claim 1, wherein a weighting factor $gamma_i$, for a scale ratio image at level i among the scale ratio images to generate the local multiscale ratio image comprises $$gamma_i = 2i/(N(N+1))$$

wherein N denotes a spatial resolution of the HR ratio image.

16. An apparatus comprising a processor and configured to perform the method recited in claim 1.

17. A non-transitory computer readable storage medium, comprising software instructions, which when executed by one or more processors perform the method recited in claim 1.

* * * * *